United States Patent [19]
Greene

[11] Patent Number: 5,464,531
[45] Date of Patent: * Nov. 7, 1995

[54] PORTABLE WATER PURIFICATION SYSTEM

[75] Inventor: Ralph G. Greene, Dalton, Ga.

[73] Assignee: Market Design & Development, Inc., Dalton, Ga.

[ * ] Notice: The portion of the term of this patent subsequent to Jan. 25, 2011, has been disclaimed.

[21] Appl. No.: 136,449

[22] Filed: Oct. 14, 1993

Related U.S. Application Data

[63] Continuation-in-part of Ser. No. 902,703, Jun. 23, 1992, Pat. No. 5,281,309.

[51] Int. Cl.$^6$ ...................................................... B01D 3/42
[52] U.S. Cl. ..................... 202/181; 202/185.3; 202/197; 202/202; 202/206; 203/1; 203/10; 203/DIG. 16; 203/DIG. 18; 222/67; 392/325
[58] Field of Search ........................... 203/1, 2, DIG. 18, 203/10, 40, DIG. 16; 202/181, 206, 200, 197, 176, 185.3, 202; 392/325, 318, 319; 137/395; 222/67, 638; 210/305

[56] References Cited

U.S. PATENT DOCUMENTS

| | | | |
|---|---|---|---|
| 851,045 | 4/1907 | Ullrick | 202/181 |
| 879,236 | 2/1908 | Bartholomew | 202/181 |
| 1,252,154 | 1/1918 | Neminger | 202/181 |
| 3,207,282 | 9/1965 | Norris, Jr. | 203/10 |
| 3,236,746 | 2/1966 | Poindexter et al. | 202/185.3 |
| 3,513,076 | 5/1970 | Lowell | 203/10 |
| 3,572,553 | 3/1971 | Ogden | 222/185 |
| 3,653,413 | 4/1972 | Sheya | 222/383 |
| 3,687,817 | 8/1972 | Jimerson et al. | 202/181 |
| 3,696,003 | 10/1972 | Fitch et al. | 202/181 |
| 3,825,491 | 7/1974 | Sanchoz | 202/181 |
| 4,017,006 | 4/1977 | Wilder | 222/67 |
| 4,200,496 | 4/1980 | Stein | 202/181 |
| 4,298,467 | 11/1981 | Gartner et al. | 210/109 |
| 4,601,789 | 7/1986 | Bjorklund | 202/181 |
| 4,690,102 | 9/1987 | Sundquist | 122/16 |
| 4,906,337 | 3/1990 | Palmer | 202/160 |
| 5,111,966 | 5/1992 | Fridman | 222/67 |
| 5,114,042 | 5/1992 | Sutera | 222/67 |
| 5,290,402 | 3/1994 | Tsai | 203/10 |

FOREIGN PATENT DOCUMENTS

| | | | |
|---|---|---|---|
| 0768138 | 2/1957 | United Kingdom | 202/181 |

Primary Examiner—Virginia Manoharan
Attorney, Agent, or Firm—Alan Ruderman

[57] ABSTRACT

A water purification device mounted within a housing adapted to be positioned on an existing water cooler/dispenser has a valve control member extending from the base of the housing and is positionable within the water reservoir of the dispenser to control the release of purified water from the device to the reservoir. The device includes a feedwater tank into which supply water is fed and which feeds water to a water level control tank which communicates with the bottom of a boiler which is maintained at the same level as the water in the control tank. The control tank includes a control valve which maintains the water in it to a predetermined level above the level of the heating element in the boiler. The boiler is connected to condenser coils for condensing vaporized water from the boiler to form distilled water which is directed through a carbon filter to a distillate storage tank where the purified water is stored until required by the water cooler/dispenser. Baffles above the boiler heating element preclude heated water from being driven into the condenser.

9 Claims, 3 Drawing Sheets

PORTABLE WATER PURIFICATION SYSTEM

REFERENCE TO RELATED APPLICATIONS

This application is a continuation-in-part of application Ser. No. 07/902,703 filed Jun. 23, 1992, now U.S. Pat. No. 5,281,309.

BACKGROUND OF THE INVENTION

This invention generally relates to a portable water purifier for purifying and storing drinking water, and more particularly to a purifier positionable on an existing conventional water cooling and dispensing unit.

Concern over drinking water purity and taste have prompted alternative sources of supply other than that supplied by processed tap water. This concern has been fueled by widely publicized reports of water pollution and by tap water often containing large amounts of water treatment chemicals, minerals and other matter.

One attempt to deal with this problem is the increased use of bottled waters. Sales of bottled waters which have increased substantially in recent years generally consists of a single serving to a one gallon container sold in retail establishments, and of larger containers, e.g., 5 gallon containers, sold for use with water cooler dispensers. Bottled cool water dispensers are extremely popular for both residential and commercial use because cold drinking water may be dispensed from generally a three to five gallon bottle without the need for plumbing. However, such bottled waters are expensive, and changing and storing large heavy and cumbersome bottles is burdensome.

Several problems with the quality of bottled waters also have been discovered and publicized in recent years. Bottled waters can readily become contaminated by airborne bacteria and viruses during the dispensing operation by the introduction of ambient air drawn inside the bottle as the water is dispensed. Further, the stagnant storage of bottled water allows bacteria to grow unchecked. Discoveries of dangerous chemicals and extremely high levels of bacteria in bottled waters has led many to the conclusion that bottled water may be no more pure, or sometimes even less pure, than ordinary tap water. Such problems with tap and bottled water have revealed a need and desire for water treatment at the point of use.

Several point of use treatment alternatives exist to tap and bottled water and are well known in the art. One such alternative is the use of carbon filtration. Carbon filters use activated charcoal to remove impurities consisting mostly of organic compounds and to improve the taste of water. Carbon filters, however, are generally ineffective in removing most inorganic compounds such as lead and arsenic.

Another alternative known in the art is the use of reverse osmosis to treat the water. Reverse osmosis units use a sediment prefilter. These units however, have a tendency to become clogged by high levels of hardness minerals and thus are not feasible for some geographic locations. Other problems with reverse osmosis include the waste of approximately 80% of the feedwater, the great expense of replacement membranes and the requirement of pressurized water feed lines and water drain lines which eliminates portability.

Another alternative point of use water treatment method is distillation. Distillation devices purify water by boiling water to generate steam, and then condense the steam to form water free from such contaminants. The contaminants having a vaporization temperature higher than that of water remain in the boiling pot, while solvents which have a boiling point lower than water may be separated from the steam by venting before condensation. The distillation process is more effective in removing impurities than reverse osmosis and does not have the problem of water waste.

Distillation devices may be portable, without the need for pressurized feed lines and drain lines or non-portable which require feed lines to supply water. Distillation alone, however, is relatively ineffective in removing volatile chemicals such as benzene and chlorine.

Existing portable distillers and most non-portable devices have failed to adequately deal with the problem of scale deposits in, and cleaning of, the boiling pot, as for example, the portable distillation device shown in U.S. Pat. No. 4,342,623 which has no provision to inhibit scale build-up. Other prior art portable distillation devices have a removable boiling pot, but require partial disassembly of the unit for removal of the boiling pot. Additionally, the known distillation units include a float valve within the boiling pot or tank, such as U.S. Pat. No. 4,943,353 which is thus exposed to the build-up of scale. When excessive scale deposits occur failure of the float valve may result which may cause an overheating situation and a system failure.

Distillation units in the prior art are of the type wherein the water is distilled and captured for subsequent use, such as illustrated in U.S. Pat. No. 4,342,623; of the type wherein uncooled water may be dispensed as illustrated in U.S. Pat. No. 4,622,102; or of the type wherein the distillation unit is coupled with refrigeration such as illustrated in U.S. Pat. No. 3,055,810. As aforesaid, bottled water dispensers are extremely popular. It would thus be advantageous to replace the water bottles of such containers with a less expensive and purer water source such as an efficient distillation unit.

In copending U.S. patent application Ser. No. 07/902,703 filed Jun. 23, 1992, a water purification apparatus is disclosed which is mounted within a housing adapted to be positioned on a conventional water cooler/dispenser. The apparatus includes a valve control member which extends from the housing and is positionable within the water reservoir of the dispenser to control the release of purified water from the apparatus to the reservoir. To provide a compact housing for the water purification apparatus requires a boiler having a small cross section. In order to provide a high energy heating element in the boiler which is necessary for providing sufficient on demand purified water for the unit a boiler with an extended length is normally required to prevent a condition known as carry-over, i.e., where the water in the boiler surges or flash vaporizes upwardly into the condenser coil, a condition which obviously is unsatisfactory. Thus, the height of the boiler disclosed in the aforesaid patent application was extended. This resulted in the height of the housing being greater than desirable. Additionally, in the apparatus disclosed in the aforesaid copending patent application the level of the water within the boiler was controlled by the water level in the feedwater tank which is at an upper portion of the apparatus so that the height of the boiler had to be great enough to prevent water within the boiler from flowing or flashing into the condenser. It is obviously desirable to reduce the height of the boiler so that the height of the entire apparatus may be reduced to provide a compact unit.

SUMMARY OF THE INVENTION

Consequently, it is a primary object of the present invention to provide water purification apparatus of a compact size that may be readily mounted on a water cooler dispensing unit to replace bottled water for point of use purification of drinking water.

It is another object of the present invention to provide a water distillation and purification unit having a boiler in which the water level is controlled by a water level control tank separate from the boiler and the feedwater tank so that there are no control elements within the boiling pot exposed to mineral deposits and the height of the boiler may be shortened.

It is another object of the present invention to provide water distillation and purification apparatus positionable on a conventional water cooler dispenser, the apparatus having a valve control member positionable within the water reservoir of the dispenser for shutting the flow of purified distilled water from the apparatus to the dispenser when the desired capacity of the reservoir has been attained and having a boiler constructed such that its height does not extend the overall height of the apparatus.

Accordingly, the present invention provides water distillation and purification apparatus mounted within a housing adapted to be positioned on a conventional water cooler dispenser, the apparatus having a valve control member extending from the housing and positionable within the water reservoir of the dispenser to control the release of purified water from the apparatus to the reservoir of the dispenser. The apparatus includes a feedwater tank into which supply water is fed, either automatically when connected to plumbing, or manually in a batch feed mode, the feedwater tank, when the water is above a minimal predetermined level therein, feeding water to a water level control tank which controls the level of the water in the boiler. The water level control tank controls the flow of raw water from the feedwater tank to the boiler which is thereby maintained at a water level equal to or less than that in the control tank only. As long as the water level in the feedwater tank is above a minimum amount the control tank will be operable and the level of water within the boiler will then be independent of the amount of water in the feedwater tank.

The boiler, in order to have a reduced length while precluding carry-over, and yet operating with a small cross sectional configuration and with a high energy heating element, includes a baffle disposed a small distance above the heating element, the baffle precluding superheated water above the heating element from forming a steam driven water burst which would cause carry-over. This baffle functions together with an upper baffle spaced slightly from the boiler outlet to permit the design of a compact boiler and thus a compact water purifier.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 3:
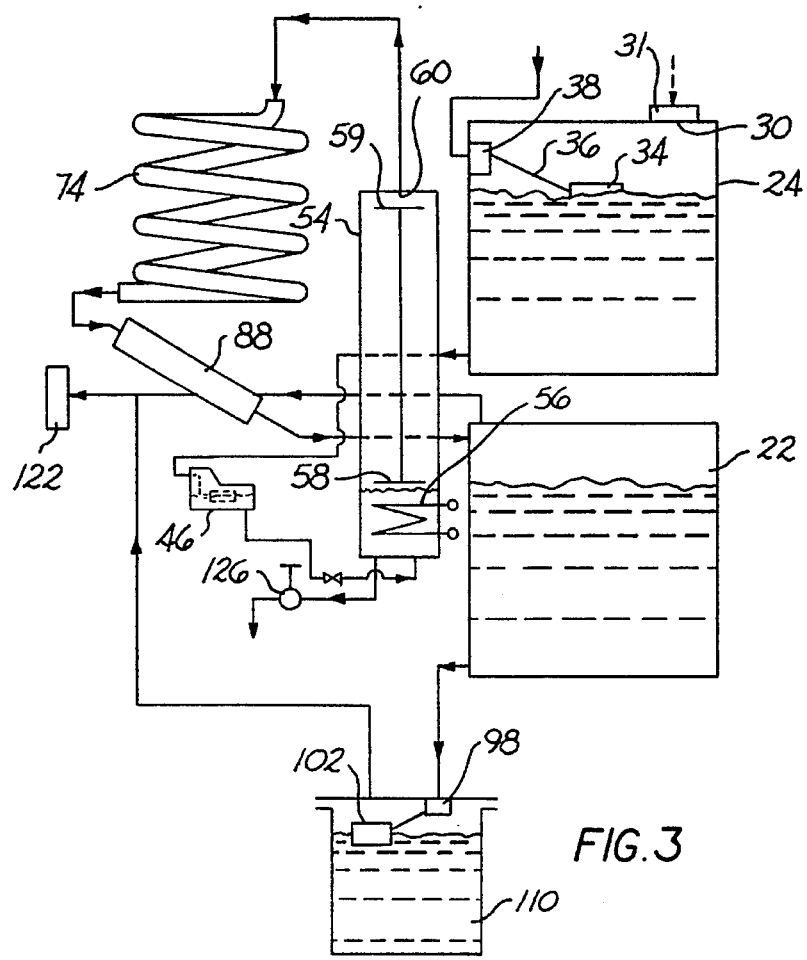
FIG. 3 is a diagrammatic view of the water distillation and purification system of the present invention.

Referring to the drawings a water distillation and purification device 10 constructed in accordance with the principles of the present invention Comprises a housing 12 preferably having a substantially rectangular configuration including a base 14 and a plurality of upstanding walls 16, 18, 20 respectively forming a portion of the front and rear walls and a side wall of the housing. Mounted on the base 14 is a distillate or distilled water tank 22, the tank having a height approximately half of that of the upstanding walls. A feedwater tank 24 is mounted on the top of the distillate tank 22 and has its top substantially coplanar with the upper edges of the upstanding walls 16, 18, 20 so that a cover (not illustrated) may be positioned thereon. The tanks 22 and 24 may be integral with or abut upstanding interior walls 26, 28 extending inwardly from the front and rear walls 16, 18 respectively. Exterior surfaces of the tanks 22, 24 may be coplanar with the walls 16 and 18 or otherwise form the remaining portions of the front and rear walls of the housing 12 and also the side remote from the side wall 20. As illustrated in FIG. 3 the feedwater tank 24 may have an opening 30 in its top, normally closed by a fill cap 31, the tank in this case being batch filled with water normally through the opening. Alternatively, the apparatus may be made automatic by connection into plumbing at the location where used, the plumbing being connected to an inlet connector 32 in the side wall 20.

Figure 1:
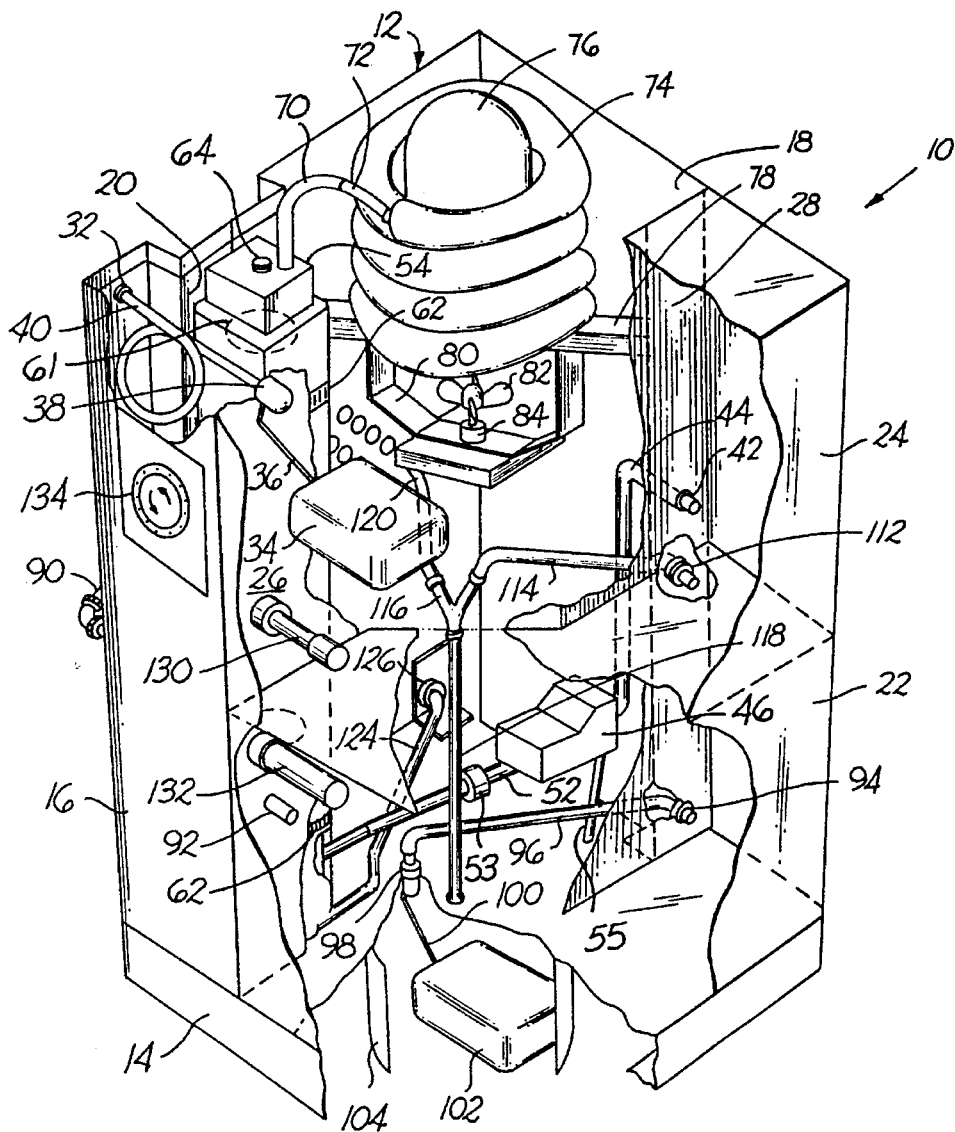
FIG. 1 is a front perspective view of water distillation and purification apparatus constructed in accordance with the principles of the present invention with portions thereof broken away.
Figure 4:
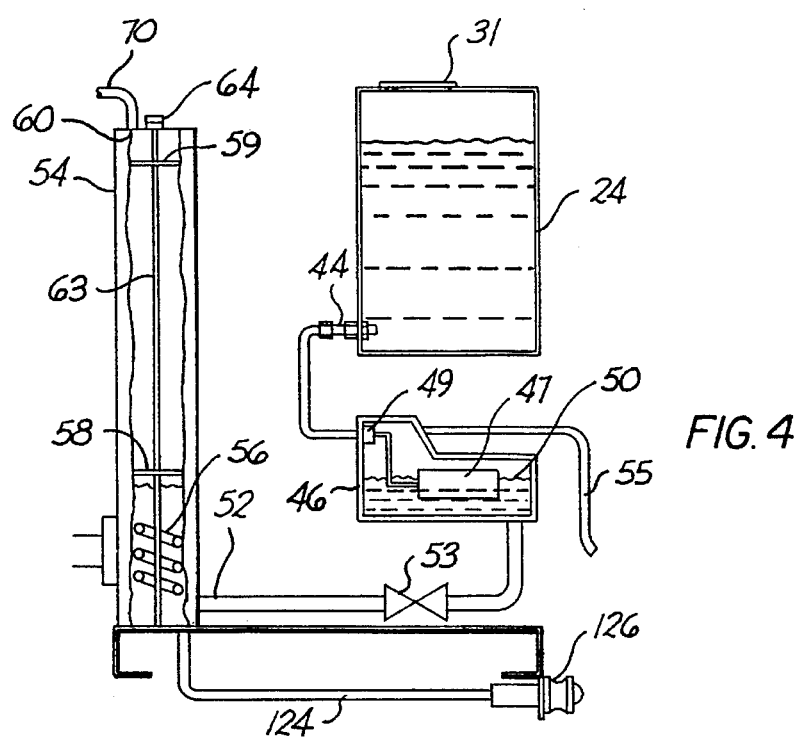
FIG. 4 is an elevational view in diagrammatic form illustrating the water level control and the baffles within the boiler.

Mounted within the feedwater tank 24, at least for those units which are to be automatically filled, is a float 34, the float being part of a float valve assembly which includes an arm 36 extending from the float to a valve member 38 connected through tubing 40 extending out of the feedwater tank to the inlet connector 32. Thus, when the level of water in the tank 24 reaches a predetermined desired amount, the valve member 38 is actuated to shut the flow of water from the tubing 40 to the tank. As best illustrated in FIGS. 1 and 4, communicating with the feedwater tank 24 through a fitting 42 adjacent the bottom of the tank is a tube 44 which at the end remote from the fitting extends into a small housing or tank 46. The tank 46 has a lower rectangular shaped base portion and a step-shaped cover. Disposed within the base portion is a float 47 connected by an arm 48 to a valve member 49 to shut the flow of water from the feedwater tank 24 through the tube 44 when the level of the water within the tank 46 is at the desired level as illustrated at 50. This water level is equivalent to the desired level of water in the boiler 54 as hereinafter described, the boiler being connected to the tank 46 by means of an outlet tube 52 extending from the tank 46. A check valve 53 is disposed in communication with the tube 52 so that heated water from the boiler is precluded from flowing back from the boiler 54 to the tank 46 while allowing water to flow from the tank 46 to the boiler. Thus, the tank 46 is a water level control tank for the boiler 54 and as long as the valve 49 is open water flows from the feedwater tank 24 through the water level control tank 46 to the boiler 54 since the feedwater tank is at a higher elevation than the water level control tank and the boiler and therefore the water pressure in the feedwater tank is greater than the water pressure in the water level control tank and the boiler.

The boiler 54 is an elongated preferably rectangular shaped housing for ease of fabrication and includes an electrical heating coil 56, as illustrated in FIGS. 3 and 4 mounted therein and supported at one side adjacent the lower end for heating water within the boiler to the boiling point as hereinafter further described. The length of the boiler is such that the upper end is below the feedwater tank or at least not above the top of the feedwater tank so that the housing 12 may be compact in size. The cross sectional dimension of the boiler in a preferred embodiment is in the order of approximately 3 inches by 4 inches and the length of the boiler is in the order of approximately 13 inches, and in order to provide a boiler with a heating element 56 having a high energy capability so that water can boil rapidly, it has been found that a baffle 58 disposed above the level of the heating element 56 is required in addition to a baffle 59 at the top of the boiler just below the boiler outlet 60 in order to preclude carryover due to the turbulence of the boiling water. The baffle 58 is approximately 1 inch above the heating coil 56 so that the steam formed above the coil does not drive a burst of water upwardly through the outlet 60. The baffles 58 and 59 are approximately 2 inch diameter disks.

As illustrated in FIG. 4 the water level within the boiler 54 is controlled by the level of the water in the water level control tank 46. This is effected by communicating the boiler directly with the control tank 46 through the check valve 53. By disposing the control tank 46 at the outlet of the feedwater tank 24 when there is sufficient water in the feedwater tank the level of water in the control tank and the boiler 54 is always above the top of the heating coil 56 so that the boiler will not boil dry. This is readily effected by mounting the feedwater tank 24 at a higher elevation than the control tank within the housing 12 and disposing the float 47 so that the water level within the control tank is above the heating element 56 while shutting off flow when the water in the boiler is approximately at the level of the baffle 58. In this manner the mounting of float valves or other controls within the boiler is avoided and thus there are no control elements within the boiler which could fail due to accumulation of mineral deposits thereon. The level control system is essentially fail-safe, but an overflow drain line 55 is provided in the control tank 46 in the event the valve 49 should fail so that the overfilling of the boiler is precluded. Additionally, as clearly illustrated in FIG. 4, the water pressure within the feed water tank is always greater than the water pressure within the tank 46 so that water from the tank 24 can flow into the housing 46 until the float 47 and its valve 49 shut the flow. Heated water from the boiler is precluded from flowing into the control tank by means of the check valve 53.

The boiler 54 is constructed from a non-corrosive material such as stainless steel and is covered about the major vertical portion thereof externally by insulation 61 held thereon by clamps 62. A rod 63 connects the baffles 58 and 59 together and to external connecting members 64 at the upper and lower ends of the boiler. A U-shape tube 70 has one end secured to the outlet 60 of the boiler and its other end connected to the inlet coupling 72 of a condenser coil 74. The condenser is coiled about an air flow circulation globe 76 disposed in spaced relationship thereto so that air may flow between the coils and the globe, the coils and globe being mounted on one or more brackets 78 extending across the housing 12. Disposed beneath the coils 74 on another mounting bracket 80 carried by the bracket 78 is a fan 82 and fan motor 84 which supplies cooling air upwardly between the coils 74 and globe 76 to condense the steam flowing through the coils into distilled water. Additionally any cooling air escaping about the coils merely acts to preheat the water in the feedwater tank.

Figure 2:
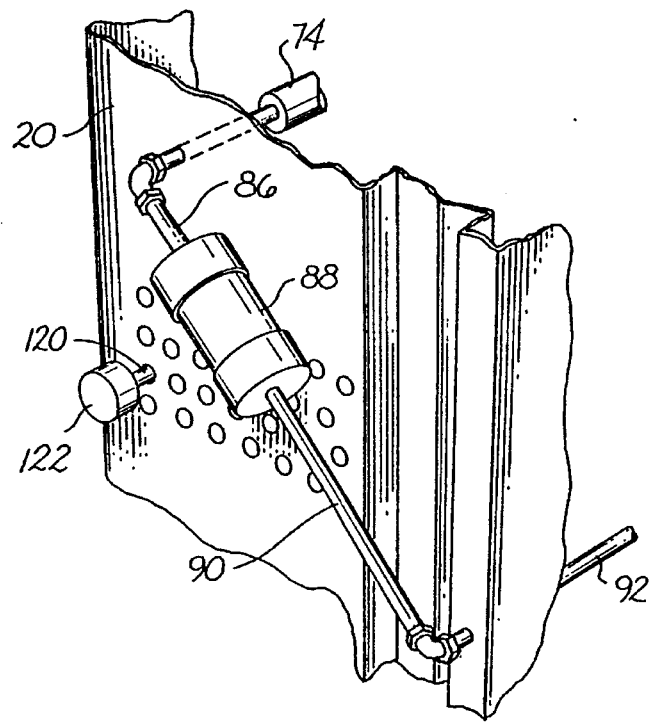
FIG. 2 is a fragmentary rear perspective view of a portion of the apparatus of FIG. 1.

As illustrated in FIG. 2, the distilled water exiting from the condenser flows out of the apparatus through tubing 86 into a carbon or activated charcoal filter 88 where the distilled water is further purified of any remaining organic compounds and where the normally flat taste of distilled water is substantially improved. The filter 88 is on the exterior of the distillation apparatus so that replacement may readily occur without disassembly of the apparatus. The distilled and purified water thereafter may flow through the filter 88 through tubing 90 and back into the apparatus through other tubing 92 which opens into the distillate storage tank 22.

Figure 5:
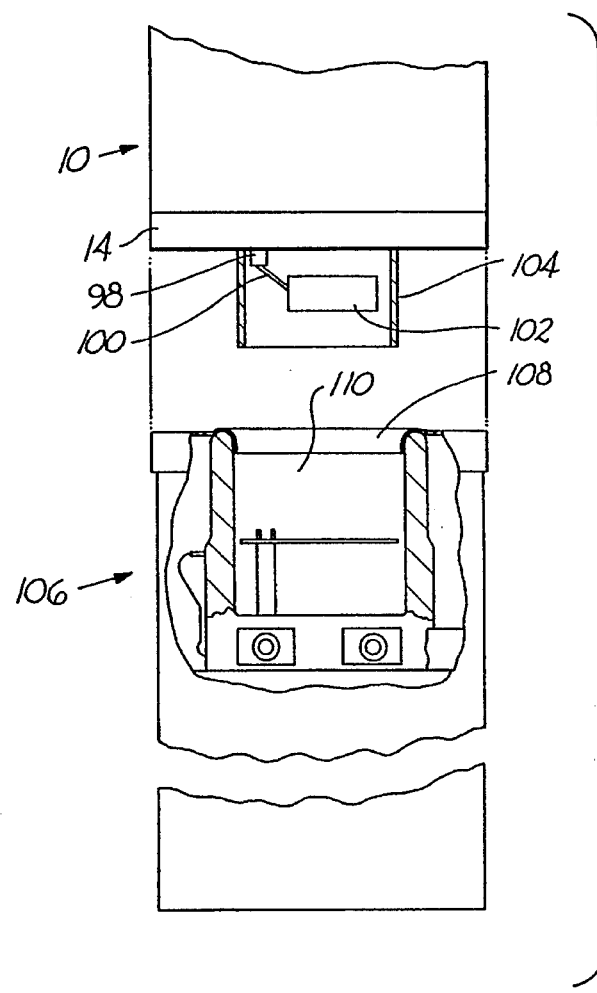
FIG. 5 is a fragmentary elevational view with parts thereof broken away and in section illustrating the mounting of the apparatus of FIG. 1 on a conventional water cooler and dispenser.

Mounted in the inner wall 28 of the housing 12 and extending into the distillate tank 22 adjacent the bottom thereof is a fitting 94 communicating the interior of the tank 22 with one end of a tube 96 disposed externally of the tank, the other end of the tube being connected to a float control valve member 98. The valve member is part of an assembly which includes an arm 100 connecting a float 102 to the valve member. When the float is raised to a predetermined position the valve is closed and the flow of water from within the tank 22 through the tube to the valve is shut. Disposed about the valve 98, the arm 100 and the float 102 and extending downwardly from the apparatus below the base 14 is an annular guard 104. Thus, as illustrated in FIG. 5, the water purification device 10 may be positioned upon a conventional bottled water cooling and dispensing unit 106 when the water bottle is removed, and the guard 104 is received within the top cabinet ring 108 of the unit 104 with the float 102 disposed within the water plenum or reservoir 110 of the unit. The water level within the plenum 110 of the cooler and dispensing unit thus effects the operation of the valve 98 and the flow of water from the tank 22 to the cooler and dispensing unit 106.

Disposed within the wall 28 and extending into an upper portion of the distillation tank 22 is another fitting 112 which is connected to one end of a tube 114. The other end of the tube 114 communicates with one leg of a Y-connector 116 having a downwardly extending tube 118 connected to another leg, the tube 118 extending through the base and opening within the interior of the guard 104. The third leg of the connector 116 communicates with a tube 120 which, as illustrated in FIG. 2, extends out the wall 20 where it is connected to an air filter 122 which traps air-borne bacteria.

A drain is provided for the boiler 54 by connecting the lower end of the boiler to one end of a tube 124 which is directed to a push button valve 126 which extends through the wall 18 so as to be manually adjustable from outside the water purification unit. When maintenance of the boiler is required, as for example when the boiler is cleaned with cleaning fluids and then flushed, the valve 126 may be opened to drain the fluid and flushing water from the boiler.

Mounted in the wall 26 and extending into the feedwater tank 24 at a selected disposition to provide a low level signal is a level float switch 130, while a similar switch 132 extends through the wall 26 into the distillate tank 22 at an upper disposition therein. The switch 130 provides a low level stop to prevent the boiler from operating when the water level within the feedwater tank 24 is below the selected level so that the feedwater tank and thus the boiler is sufficiently full, while the switch 132 provides a high level stop to prevent operation of the boiler when the water level within the distillate tank 22 reaches a predetermined stop level. Thus, overheating of the boiler is precluded through the switch 130 while energy waste is minimized through the switch 132. The apparatus also includes a 24 hour timer 134 mounted on the front for selecting the times within which the boiler may operate, such as at night in the summer to reduce the heat load in the room in which the purification apparatus is located. The apparatus also includes a thermostat, as illustrated in FIG. 6, in the control circuitry to ensure that the boiler does not overheat should a control failure occur and should insufficient water be supplied to keep the temperature below a maximum limit, such as 250° F.

Figure 6:
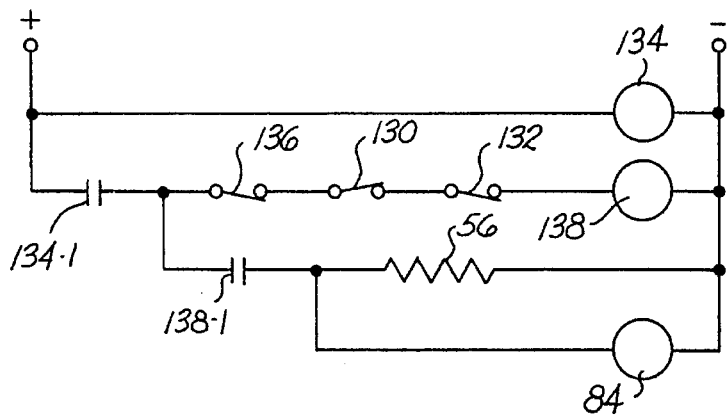
FIG. 6 is a schematic view illustrating the electrical control circuitry of the apparatus of FIG. 1.

The operation of the boiler is controlled by the circuit illustrated in FIG. 6. As aforesaid the water level in the feedwater tank 24 must be above the level float switch 130 and the water level in the distillate tank 22 must be below the level float switch 132 for the boiler heating coil 56 to be energized. Additionally the timer 134 must be energized and the thermostat 136 must be closed, i.e., the temperature in the boiler must be below the preselected shut-off temperature. With these conditions satisfied, the normally opened contacts 134-1 of the timer will close to energize the coil of a relay 138 mounted in series with the thermostat 136 and the switches 130, 132. Energizing the relay closes its normally open contacts 138-1 to energize both the heater coil 56 and the fan motor 84 which together are connected in series with the contacts 138-1. If the timer is not energized, its contacts 134-1 remain open so that the relay cannot be energized and neither can the heater and fan. Opening of either of the switches 130, 132 or an over temperature condition opening the thermostat contacts also precludes energizing the relay 138 and thus the heating coil and fan.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Water purification apparatus positionable upon an existing water dispenser having an open top water reservoir, said apparatus comprising a housing including a base at the bottom of said housing, a feedwater tank for receiving water to be purified, an upstanding boiler having an electrical heating element disposed therein adjacent a lower end for boiling water, a water level control tank communicating said feedwater tank to said boiler, means for mounting said feedwater tank relative to said control tank such that when water within said feedwater tank is above a predetermined level there is water in said control tank, valve control means in said control tank for controlling the level of water therein from exceeding a predetermined level, means for mounting said control tank at an elevation wherein said predetermined level is above said heating element, whereby said heating element is submerged in water in said boiler, a condenser for receiving steam from said boiler and for condensing said steam to form distilled water, a distillate tank, means communicating said condenser with said distillate tank for supplying distilled water to said distillate tank, said distillate tank having a water outlet, a port opening downwardly through said base, means for communicating said outlet with said port, float valve means including a valve disposed for opening and closing communication between said port and said outlet, and said valve means including a float for controlling said valve disposed at an elevation below said base for receipt within said water reservoir for opening and closing said valve in response to water within said reservoir when said apparatus is positioned upon said dispenser.

2. Water purification apparatus as recited in claim 1, wherein said boiler includes a first baffle disposed adjacent said lower end above said heating element, and a second baffle disposed above said first baffle adjacent an upper end, said baffles permitting steam from exiting said boiler to said condenser but precluding water from exiting said boiler to said condenser.

3. Water purification apparatus as recited in claim 2, wherein said first baffle is disposed at an elevation substantially equal to said predetermined level.

4. Water purification apparatus as recited in claim 2, wherein said water level control tank is disposed below said feedwater tank and said valve control means includes a float valve for shutting flow of water from said feedwater tank when said predetermined level is reached, and a check valve disposed in communication with said control tank and said boiler for closing flow of water from said boiler to said control tank while permitting water to flow from said control tank to said boiler.

5. Water purification apparatus as recited in claim 4, wherein said means communicating said condenser with said distillate tank comprises activated carbon filter means.

6. Water purification apparatus as recited in claim 4, including a first level float switch disposed in said feedwater tank for providing a first signal when the water in said feedwater tank is below a first desired level, a second level float switch in said distillate tank for providing a second signal when the water within said distillate tank is above a second desired level, and electrical circuit means including said first and second switches for shutting flow of electrical current to said heating element when said first signal is provided by said first switch or said second signal is provided by said second switch.

7. Water purification apparatus as recited in claim 6, wherein said circuit means includes an electrical timer for activating said circuit only during selected times so that said heater can operate only during said times.

8. Water purification apparatus as recited in claim 1, including a first level float switch disposed in said feedwater tank for providing a first signal when the water in said feedwater tank is below a first desired level, a second level float switch in said distillate tank for providing a second signal when the water within said distillate tank is above a second desired level, and electrical circuit means including said first and second switches for shutting flow of electrical current to said heating element when said first signal is provided by said first switch or said second signal is provided by said second switch.

9. Water purification apparatus as recited in claim 8, wherein said circuit means includes an electrical timer for activating said circuit only during selected times so that said heater can operate only during said times.

\* \* \* \* \*